United States Patent
Park

(10) Patent No.: US 12,468,948 B2
(45) Date of Patent: Nov. 11, 2025

(54) APPARATUS AND METHOD FOR ANOMALY DETECTION

(71) Applicant: SK Planet Co., Ltd., Seongnam-si (KR)

(72) Inventor: Yeonghyeon Park, Cheonan-si (KR)

(73) Assignee: SK Planet Co., Ltd., Seongnam-si (KR)

( * ) Notice: Subject to any disclaimer, the term of this patent is extended or adjusted under 35 U.S.C. 154(b) by 680 days.

(21) Appl. No.: 17/894,641

(22) Filed: Aug. 24, 2022

(65) Prior Publication Data
US 2023/0065385 A1    Mar. 2, 2023

(30) Foreign Application Priority Data

| Aug. 26, 2021 | (KR) | 10-2021-0113011 |
| Nov. 22, 2021 | (KR) | 10-2021-0161702 |
| Feb. 7, 2022  | (KR) | 10-2022-0015788 |

(51) Int. Cl.
G06F 7/00    (2006.01)
G06F 17/00   (2019.01)
G06N 3/082   (2023.01)

(52) U.S. Cl.
CPC .................. G06N 3/082 (2013.01)

(58) Field of Classification Search
CPC ................................. G06N 3/082
USPC ......................................... 707/20
See application file for complete search history.

(56) References Cited

U.S. PATENT DOCUMENTS

| 2020/0051017 A1* | 2/2020 | Dujmic | G06V 10/454 |
| 2021/0011791 A1* | 1/2021 | Okanohara | G06F 11/0703 |
| 2021/0073977 A1* | 3/2021 | Carter | G06T 11/20 |
| 2021/0124981 A1* | 4/2021 | Kim | G06F 18/2413 |
| 2022/0084173 A1* | 3/2022 | Liang | G06T 11/60 |
| 2022/0198267 A1* | 6/2022 | Rama | G06N 3/08 |
| 2022/0343140 A1* | 10/2022 | Qu | G06N 20/00 |
| 2023/0229918 A1* | 7/2023 | Park | G06N 3/09 |
| | | | 706/15 |

FOREIGN PATENT DOCUMENTS

| KR | 10-2021-0065276 A | 6/2021 |
| KR | 10-2297232 B | 9/2021 |

* cited by examiner

*Primary Examiner* — Pavan Mamillapalli
(74) *Attorney, Agent, or Firm* — WTA IP Law P.C.

(57) ABSTRACT

An anomaly detection method and apparatus are provided using an attention mechanism or based on an artificial neural network for minimizing computational cost. In an embodiment, the anomaly detection method may include entering, by a detection unit, input data into a detection network; generating, by the detection network, an attention map and output data through a plurality of operations in which a plurality of layer weights are applied to the input data; generating, by the detection unit, an attention map by overlapping the attention map with the input data when an attention region having an attention value greater than or equal to a predetermined threshold exists in the attention map; detecting, by the detection unit, whether the input data is normal or abnormal according to the output data; and outputting, by the detection unit, the detection map and an anomaly detection result indicating whether the input data is normal or abnormal.

9 Claims, 12 Drawing Sheets

(A)  (B)  (C)

APPARATUS AND METHOD FOR ANOMALY DETECTION

CROSS-REFERENCE TO RELATED APPLICATIONS

The present application is based upon and claims the benefit of priority to Republic of Korea Patent Application No. 10-2021-0113011, filed on Aug. 26, 2021, Republic of Korea Patent Application No. 10-2021-0161702, filed on Nov. 22, 2021, and Republic of Korea Patent Application No. 10-2022-0015788, filed on Feb. 7, 2022, each of which is hereby incorporated by reference in its entirety.

TECHNICAL FIELD

The present disclosure relates to a technology for anomaly detection, and more particularly, to an anomaly detection technique using an attention mechanism or based on an artificial neural network for minimizing computational cost.

BACKGROUND ART

Anomaly detection is a technique for finding abnormal data that shows a pattern different from expected. For anomaly detection, cases that use machine learning or deep learning techniques are increasing. As a representative example, manufacturers are introducing such an anomaly detection technique for the purpose of speeding up and automating the determination of good/defective products for their products.

In addition, there is a recent effort to minimize human fatigue by automating the anomaly detection by introducing an artificial neural network. In automation, a system can be configured to perform the anomaly detection for multiple targets with a single monitoring device, that is, a high-performance discrimination device. However, in this case, if an error occurs in the high-performance discrimination device, the status of all connected monitoring targets cannot be checked.

In order to alleviate the above issue, the introduction of edge devices, that is, edge discrimination devices, may be considered. If each edge discrimination device is installed in a one-to-one correspondence with its monitoring target, the status of targets connected to other edge discrimination devices can be monitored without any problem even when an error occurs in a certain edge discrimination device. Further, it is possible to obtain cost-effectiveness that a larger number of edge discrimination devices can be installed at the cost of installing one high-performance discrimination device. However, it may be difficult for edge discrimination devices to perform high-level and complex calculations due to limitations in power and computing resources. Thus, to introduce an artificial neural network, the complexity of the neural network should be reduced as much as possible.

SUMMARY

Accordingly, the present disclosure is intended to provide an apparatus and method for anomaly detection that can provide a detection result to accurately recognize an anomaly occurrence location by using an attention mechanism.

In addition, the present disclosure is intended to an apparatus and method capable of minimizing computational cost in case of anomaly detection for edge computing purposes or anomaly detection requiring a high-efficiency artificial neural network.

According to an embodiment of the present disclosure, a method for anomaly detection may include entering, by a detection unit, input data into a detection network; generating, by the detection network, an attention map and output data through a plurality of operations in which a plurality of layer weights are applied to the input data; generating, by the detection unit, an attention map by overlapping the attention map with the input data when an attention region having an attention value greater than or equal to a predetermined threshold exists in the attention map; detecting, by the detection unit, whether the input data is normal or abnormal according to the output data; and outputting, by the detection unit, the detection map and an anomaly detection result indicating whether the input data is normal or abnormal.

In the method, in case that the detection network is a generative network, the detection unit may determine whether the input data is normal or abnormal, based on a restoration loss indicating a difference between the input data and the output data.

The method may further include, in case that the detection network is a generative network, before entering, by the detection unit, the input data into the detection network, preparing, by a learning unit, training input data by selecting only data in a normal state; entering, by the learning unit, the training input data into the detection network; generating, by the detection network, an attention map by performing a plurality of operations in which a plurality of layer weights are applied to the training input data, followed by deriving training output data imitating the training input data; calculating, by the learning unit, a restoration loss indicating a difference between the training input data and the training output data; and performing, by the learning unit, optimization for updating the weight of the detection network through a backpropagation algorithm to minimize the restoration loss.

In the method, in case that the detection network is a classification network, the detection unit may determine whether the input data is normal or abnormal, based on a probability of a normal state of the output data and a probability of an abnormal state of the output data.

The method may further include, in case that the detection network is a classification network, before entering, by the detection unit, the input data into the detection network, preparing, by a learning unit, training input data to which a label is assigned; entering, by the learning unit, the training input data into the detection network; generating, by the detection network, an attention map by performing a plurality of operations in which a plurality of layer weights are applied to the training input data, followed by calculating training output data including a probability of a normal state of the training input data and a probability of an abnormal state of the training input data; calculating, by the learning unit, a classification loss indicating a difference between the label and the training output data; and performing, by the learning unit, optimization for updating the weight of the detection network through a backpropagation algorithm to minimize the classification loss.

According to an embodiment of the present disclosure, an apparatus for anomaly detection may include a detection unit configured to enter input data into a detection network, to generate, using the detection network, an attention map and output data through a plurality of operations in which a plurality of layer weights are applied to the input data, to generate an attention map by overlapping the attention map with the input data when an attention region having an attention value greater than or equal to a predetermined threshold exists in the attention map, to detect whether the input data is normal or abnormal according to the output data, and to output the detection map and an anomaly detection result indicating whether the input data is normal or abnormal.

In the apparatus, in case that the detection network is a generative network, the detection unit may be configured to determine whether the input data is normal or abnormal, based on a restoration loss indicating a difference between the input data and the output data.

The apparatus may further include a learning unit configured to, in case that the detection network is a generative network, prepare training input data by selecting only data in a normal state, to enter the training input data into the detection network, to generate, using the detection network, an attention map by performing a plurality of operations in which a plurality of layer weights are applied to the training input data, and derive training output data imitating the training input data, to calculate a restoration loss indicating a difference between the training input data and the training output data, and to perform optimization for updating the weight of the detection network through a backpropagation algorithm to minimize the restoration loss.

In the apparatus, in case that the detection network is a classification network, the detection unit may be configured to determine whether the input data is normal or abnormal, based on a probability of a normal state of the output data and a probability of an abnormal state of the output data.

The apparatus may further include a learning unit configured to, in case that the detection network is a classification network, prepare training input data to which a label is assigned, to enter the training input data into the detection network, to generate, using the detection network, an attention map by performing a plurality of operations in which a plurality of layer weights are applied to the training input data, and calculate training output data including a probability of a normal state of the training input data and a probability of an abnormal state of the training input data, to calculate a classification loss indicating a difference between the label and the training output data, and to perform optimization for updating the weight of the detection network through a backpropagation algorithm to minimize the classification loss.

According to another embodiment of the present disclosure, a method for anomaly detection may include entering, by a detection unit, input data into a detection model; generating, by the detection model, restored data imitating the input data by performing an operation on the input data while maintaining a dimension of the input data; calculating, by the detection unit, a verification error indicating a difference between the input data and the restored data; and detecting, by the detection unit, an anomaly of the input data when the verification error is equal to or greater than a predetermined reference value.

In the method, each of a plurality of layers in the detection model may generate output data by performing operations while maintaining the dimension of the input data, whereby the generated restored data has the same dimension as the input data and has a difference in value.

The method may further include, before entering, by the detection unit, the input data into the detection model, preparing, by a learning unit, training input data; entering, by the learning unit, the training input data into the detection model for which learning is not completed; generating, by the detection model, training restored data imitating the training input data while maintaining the dimension of the training input data through an operation on the training input data; calculating, by the learning unit, a restoration loss indicating a difference between the training input data and the training output data; and performing, by the learning unit, optimization for updating a weight of the detection model to minimize the restoration loss.

The method may further include, before entering, by the detection unit, the input data into the detection model, preparing, by a learning unit, training input data; entering, by the learning unit, the training input data into the detection model for which learning is not completed; generating, by a transistor of the detection model, training restored data imitating the training input data while maintaining the dimension of the training input data through an operation on the training input data; calculating, by a discriminator of the detection model, a discriminant value by performing an operation on the training input data and the training restored data, wherein the discriminant value indicates a probability that each of the training input data and the training restored data is real data or fake data; calculating, by the learning unit, an adversarial loss indicating a difference of the discriminant value between the training input data and the training output data; and performing, by the learning unit, optimization for updating a weight of the detection model to minimize the adversarial loss.

The method may further include calculating, by the learning unit, a threshold value $\theta$ of the detection model through Equation $\theta = \mu + (k \times \sigma)$ wherein $\mu$ denotes an average of a mean squared error (MSE) between a plurality of test input data and a plurality of test restored data corresponding to the plurality of test input data, $\sigma$ denotes a standard deviation of the MSE between the plurality of test input data and the plurality of test restored data corresponding to the plurality of test input data, and k denotes a weight for the standard deviation.

According to another embodiment of the present disclosure, an apparatus for anomaly detection may include a detection unit configured to enter input data into a detection model, to generate, using the detection model, restored data imitating the input data by performing an operation on the input data while maintaining a dimension of the input data, to calculate a verification error indicating a difference between the input data and the restored data, and to detect an anomaly of the input data when the verification error is equal to or greater than a predetermined reference value.

In the apparatus, the detection model may have a plurality of layers, and each of the plurality of layers may generate output data by performing operations while maintaining the dimension of the input data, whereby the generated restored data has the same dimension as the input data and has a difference in value.

The apparatus may further include a learning unit configured to enter the training input data into the detection model for which learning is not completed, to generate, using the detection model, training restored data imitating the training input data while maintaining the dimension of the training input data through an operation on the training input data, to calculate a restoration loss indicating a difference between the training input data and the training output data, and to perform optimization for updating a weight of the detection model to minimize the restoration loss.

The apparatus may further include a learning unit configured to enter the training input data into the detection model for which learning is not completed, to generate, using a transistor of the detection model, training restored data imitating the training input data while maintaining the dimension of the training input data through an operation on the training input data, to calculate, using a discriminator of the detection model, a discriminant value by performing an operation on the training input data and the training restored data, wherein the discriminant value indicates a probability that each of the training input data and the training restored data is real data or fake data, to calculate an adversarial loss indicating a difference of the discriminant value between the training input data and the training output data, and to perform optimization for updating a weight of the detection model to minimize the adversarial loss.

In the apparatus, the learning unit may be configured to calculate a threshold value $\theta$ of the detection model through Equation $\theta = \mu + (k \times \sigma)$ wherein $\mu$ denotes an average of a mean squared error (MSE) between a plurality of test input data and a plurality of test restored data corresponding to the plurality of test input data, $\sigma$ denotes a standard deviation of the MSE between the plurality of test input data and the plurality of test restored data corresponding to the plurality of test input data, and k denotes a weight for the standard deviation.

According to the present disclosure, it is possible to more accurately provide an anomaly occurrence location by using the attention map. This allows the cause of the abnormality to be recognized more clearly.

In addition, according to the present disclosure, it is possible to reduce the resources, load, and time required for the operation because the operation is performed without a bottleneck structure, in which the encoder compresses information and the decoder expands the compressed information, and thereby generates restored data for input data without reducing or expanding the dimension. This allows computational cost for anomaly detection to be minimized.

DETAILED DESCRIPTION

Figure 1:
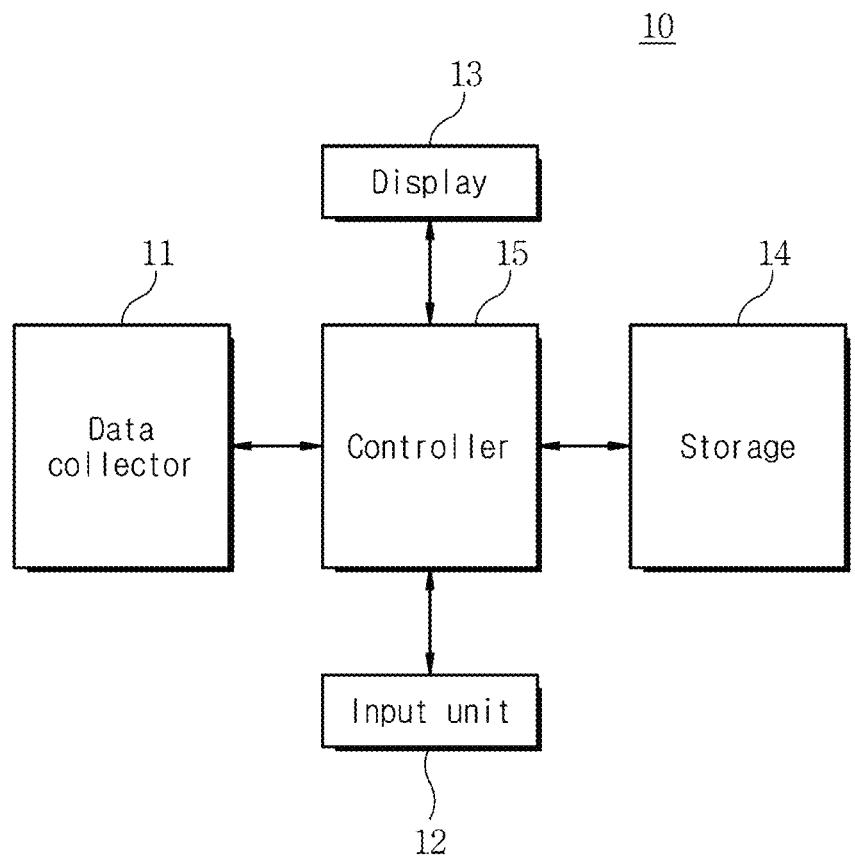
FIG. 1 is a diagram illustrating the configuration of an apparatus for anomaly detection using an attention mechanism according to a first embodiment of the present disclosure.

Now, embodiments of the present disclosure will be described in detail with reference to the accompanying drawings.

However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

Additionally, the terms including expressions "first", "second", etc. are used for merely distinguishing one element from other elements and do not limit the corresponding elements. Also, these ordinal expressions do not intend the sequence and/or importance of the elements.

Further, when it is stated that a certain element is "coupled to" or "connected to" another element, the element may be logically or physically coupled or connected to another element. That is, the element may be directly coupled or connected to another element, or a new element may exist between both elements.

In addition, the terms used herein are only examples for describing a specific embodiment and do not limit various embodiments of the present disclosure. Also, the terms "comprise", "include", "have", and derivatives thereof mean inclusion without limitation. That is, these terms are intended to specify the presence of features, numerals, steps, operations, elements, components, or combinations thereof, which are disclosed herein, and should not be construed to preclude the presence or addition of other features, numerals, steps, operations, elements, components, or combinations thereof.

Also, in the following description, especially in claims, singular forms are intended to include plural forms unless the context clearly indicates otherwise. That is, the terms "a", "an", "one", and "the" may be used as both singular and plural meanings unless the context clearly indicates otherwise.

The term "module" or "unit" used herein may refer to a hardware or software component or device, such as a field programmable gate array (FPGA) or application specific integrated circuit (ASIC), which performs at least one particular function, operation, or task. A module or unit may be configured to reside on an addressable storage medium and configured to execute on one or more processors.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In the description and claims, the term "network" or "communication network" is defined as one or more data links that enable electronic data to be transmitted between computer systems and/or modules. When any information is transferred or provided to a computer system via a network or other (wired, wireless, or a combination thereof) communication connection, this connection can be understood as a computer-readable medium. The computer-readable instructions include, for example, instructions and data that cause a general purpose computer system or special purpose computer system to perform a particular function or group of functions. The computer-executable instructions may be binary, intermediate format instructions, such as, for example, an assembly language, or even source code.

In addition, the disclosure may be implemented in network computing environments having various kinds of computer system configurations such as PCs, laptop computers, handheld devices, multiprocessor systems, microprocessor-based or programmable consumer electronics, network PCs, minicomputers, mainframe computers, mobile phones, PDAs, pagers, and the like. The disclosure may also be implemented in distributed system environments where both local and remote computer systems linked by a combination of wired data links, wireless data links, or wired and wireless data links through a network perform tasks. In such distributed system environments, program modules may be located in local and remote memory storage devices.

Figure 2:
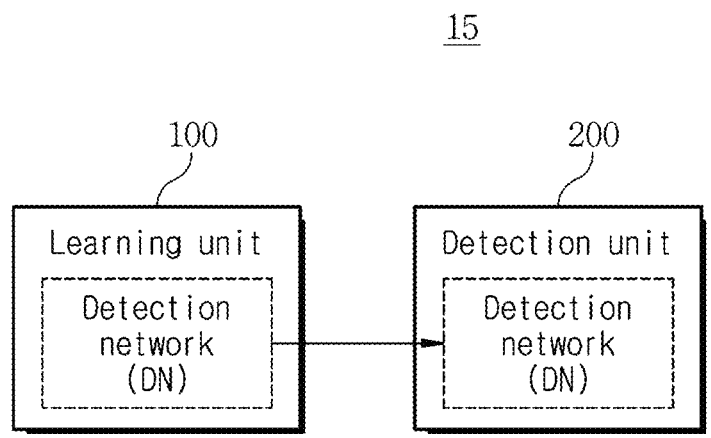
FIG. 2 is a diagram illustrating the configuration of the controller shown in FIG. 1.
Figure 3:
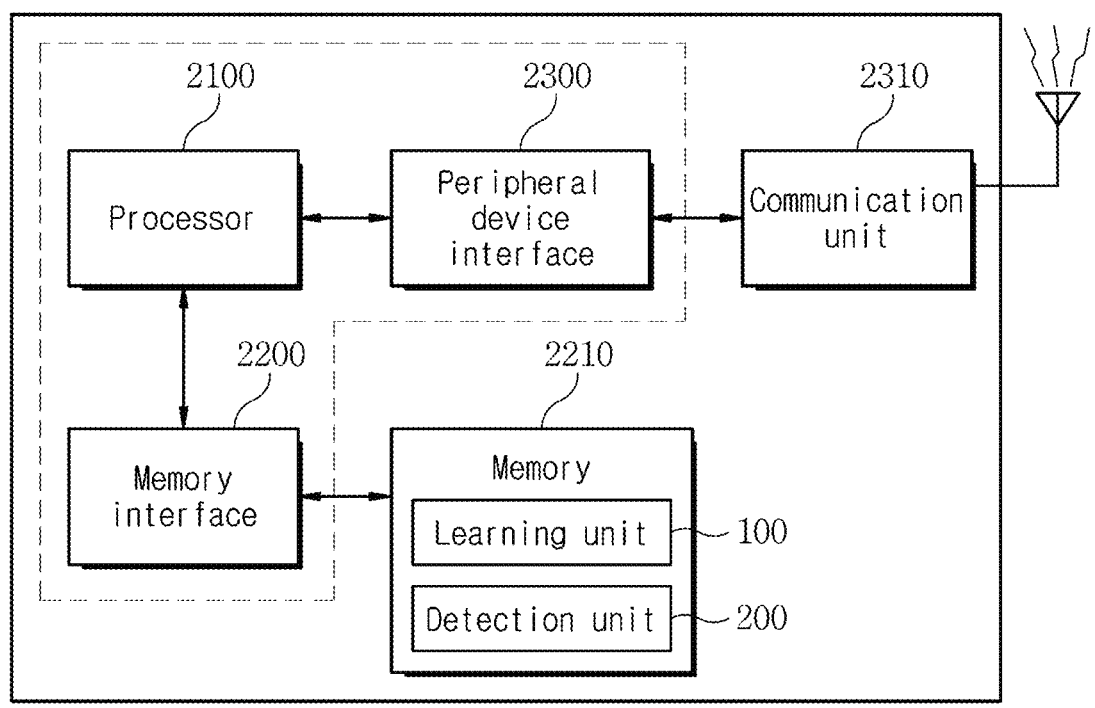
FIG. 3 is an exemplary diagram illustrating a hardware system for implementing the controller shown in FIG. 1.

At the outset, an apparatus for anomaly detection using an attention mechanism according to a first embodiment of the present invention will be described. FIG. 1 is a diagram illustrating the configuration of an apparatus for anomaly detection using an attention mechanism according to a first embodiment of the present disclosure. FIG. 2 is a diagram illustrating the configuration of the controller shown in FIG. 1. FIG. 3 is an exemplary diagram illustrating a hardware system for implementing the controller shown in FIG. 1.

Referring to FIG. 1, an apparatus 10 (hereinafter referred to as an anomaly detection apparatus) for anomaly detection using an attention mechanism according to a first embodiment of the present disclosure includes a data collector 11, an input unit 12, a display 13, a storage 14, and a controller 15.

The data collector 11 is a component for collecting input data or data to be used as training input data. In the first embodiment, as an example of data, an image of a product captured by a camera or the like to determine a good or defective product produced in a production facility such as a smart factory will be used. However, in the first embodiment, data is not limited to images. In the first embodiment, data includes various types of data collected through various sensors to determine a good or defective product produced in a production facility such as a smart factory. Such various types of data include a sensor signal, an audio signal, an image, and the like. For example, the sensor signal may be a vibration frequency when the sensor is a vibration sensor. In addition, when the sensor is a microphone, the audio signal may be noise generated by the product. Also, when the sensor is a general camera, a depth camera, an infrared camera, a thermal imaging imager, etc., the image may be an image expressed in gray-scale or RGB captured by the camera, or an image taken by a depth camera, an infrared camera, a thermal imaging camera, etc. Moreover, such an image may be a moving image having a time sequence. The data collector 11 stores the collected data in the storage 14 under the control of the controller 15.

The input unit 12 receives a user's key input for controlling the anomaly detection apparatus 10, generates an input signal, and transmits it to the controller 15. The input unit 12 may include at least one of a power on/off key, number keys, and navigation keys, and may be formed as a predetermined function key on one surface of the anomaly detection apparatus 10. In case that the display 13 is formed of a touch screen, functions of various keys of the input unit 12 may be performed on the display 13. If all functions can be performed only with the touch screen, the input unit 12 may be omitted.

The display 13 is a component for displaying a screen and may visually provide the user with a menu of the anomaly detection apparatus 10, input data, function setting information, and other various kinds of information. The display 13 may be formed of a liquid crystal display (LCD), an organic light emitting diode (OLED), an active matrix OLED (AMOLED), or the like. Meanwhile, the display 13 may be implemented with a touch screen. In this case, the display 13 includes a touch sensor. The touch sensor detects a user's touch input. The touch sensor may be formed of a touch sensing sensor of a capacitive overlay type, a pressure type, a resistive overlay type, or an infrared beam type, or may be formed of a pressure sensor. In addition to the above sensors, all kinds of sensor devices capable of sensing contact or pressure of an object may be used as the touch sensor. The touch sensor can detect a user's touch input, generate a detection signal including input coordinates indicating a touch position, and transmit it to the controller 15.

The storage 14 is a component for storing programs and data necessary for the operation of the anomaly detection apparatus 10 and may be divided into a program region and a data region. The program region may store a program for controlling the overall operation of the anomaly detection apparatus 10, an operating system (OS) for booting the anomaly detection apparatus 10, an application program, and the like. The data region may store data generated according to the use and operation of the anomaly detection apparatus 10. In particular, the data region may store data collected by the data collector 11. Various data stored in the storage 14 may be deleted, changed, or added.

The controller 15 is capable of controlling the overall operation of the anomaly detection apparatus 10 and a signal flow between internal blocks of the anomaly detection apparatus 10, and performing a data processing function. In addition, basically, the controller 15 controls various functions of the anomaly detection apparatus 10. The controller 15 may be a central processing unit (CPU), a digital signal processor (DSP), and/or the like.

Referring to FIG. 2, the controller 15 includes a learning unit 100 and a detection unit 200.

The learning unit 100 is configured to train a detection network DN. The detection network DN may be a generative network that generates output data that imitates input data, or a classification network that generates output data that classifies input data according to probability. The generative network may be, for example, an auto-encoder, a generative adversarial network (GAN), or the like. The classification network may be, for example, a convolutional neural network (CNN). The detection network (DN includes a plurality of operations in which a plurality of layer weights are applied. Here, the plurality of layers may include a fully-connected layer, a convolutional layer, a recurrent layer, a graph layer, and the like. The convolutional layer may include 1D-convolution, 2D-convolution, 3D-convolution, depth-wise convolution, etc. The recurrent layer may include a general recurrent layer, a long short-term memory (LSTM) layer, a gated recurrent unit (GRU) layer, etc. The graph layer may be a layer of graph structure having various forms including a graph convolution layer.

In particular, the detection network DN of the present disclosure includes an attention mechanism. Thus, the detection network DN may perform an attention operation on input data through the attention mechanism, calculate attention values for individual elements of the data, and thereby generate an attention map. For example, in case that data (input data or training input data) inputted to the detection network DN is an image, individual elements of the data may be pixels. In this case, the detection network DN may calculate an attention value for each pixel through an attention operation and thereby generate an attention map including a plurality of attention values. In this case, the detection network DN may normalize the attention values so that, for example, a minimum value of 0 and a maximum value of 1 are maintained. This normalization method may be, for example, min-max normalization.

The detection unit 200 detects whether there is an anomaly by using the detection network DN. The detection unit 200 may enter input data to the detection network DN. Then, the detection network DN may generate an attention map and output data through a plurality of operations in which a plurality of layer weights are applied to the input data. Then, the detection unit 200 detects an attention region having an attention value greater than or equal to a predetermined threshold in the attention map, and creates a detection map by overlapping the detected attention region with the input data. In addition, the detection unit 200 detects whether there is an anomaly in the input data according to the output data, and may output through the display 13 the detection map and the anomaly detection result indicating whether the input data is normal or abnormal.

Meanwhile, referring to FIG. 3, the above-described components of the controller 15 may be implemented in the form of a software module, a hardware module, or a combination thereof executed by a processor.

Such a software module, hardware module, or its combination, executed by a processor, may be implemented as an actual hardware system such as a computer system.

Now, a hardware system 2000 in which the controller 15 according to the first embodiment of the present disclosure is implemented in the form of hardware will be described with reference to FIG. 3.

As shown in FIG. 3, the hardware system 2000 according to the first embodiment may have components including a processor 2100, a memory interface 2200, and a peripheral device interface 2300.

Each component in the hardware system 2000 may be an individual electronic component or be integrated in one or more integrated circuits, and these components may be electrically connected to each other via a bus system (not shown).

The bus system may include one or more individual physical buses, connected by suitable bridges, adapters, and/or controllers, communication lines/interfaces, and/or an abstraction representing multi-drop or point-to-point connections.

The processor 2100 communicates with the memory 2210 through the memory interface 2200 to perform various functions in the hardware system, thereby executing various software modules stored in the memory 2210.

In the memory 2210, the learning unit 100 and the detection unit 200, which are components of the controller 15 described above with reference to FIG. 2, may be stored in the form of a software module. Also, an operating system (OS) or the like may be further stored.

The operating system may be, for example, an embedded operating system such as I-OS, Android, Darwin, RTXC, LINUX, UNIX, OS X, WINDOWS, or VxWorks. The operating system includes various procedures, instruction sets, software components, and/or drivers for controlling and managing general system tasks (e.g., memory management, storage device control, power management, etc.), and serves to facilitate communication between various hardware modules and software modules.

The memory 2210 may include, but is not limited to, a cache, a main memory, and a secondary memory. The memory 2210 may include a memory hierarchy implemented through any combination of a RAM (e.g., SRAM, DRAM, DDRAM), ROM, FLASH, magnetic and/or optical storage device (e.g., disk drive, magnetic tape, compact disk (CD), and digital video disc (DVD), etc.).

The peripheral device interface 2300 serves to enable communication between the processor 2100 and peripheral devices.

The peripheral devices are for providing different specific functions to the hardware system 2000. In the first embodiment, the peripheral devices may include, for example, a communication unit 2310.

The communication unit 2310 performs a communication function with other devices. To this end, the communication unit 2310 may include, but is not limited to, an antenna system, an RF transceiver, one or more amplifiers, a tuner, one or more oscillators, a digital signal processor, a CODEC chipset, a memory, and a suitable circuit.

The communication unit 2310 may support wired/wireless communication protocols. The wireless communication protocol may include, for example, wireless local area network (WLAN), digital living network alliance (DLNA), wireless broadband (Wibro), world interoperability for microwave access (Wimax), global system for mobile communication (GSM), code division multi access (CDMA), CDMA2000, enhanced voice-data optimized or enhanced voice-data only (EV-DO), wideband CDMA (WCDMA), high speed downlink packet access (HSDPA), high speed uplink packet access (HSUPA), IEEE 802.16, long term evolution (LTE), LTE-Advanced (LTE-A), 5G communication system, wireless mobile broadband service (WMBS), Bluetooth, radio frequency identification (RFID), infrared data association (IrDA), ultra-wideband (UWB), ZigBee, near field communication (NFC), ultra sound communication (USC), visible light communication (VLC), Wi-Fi, Wi-Fi direct, and the like. In addition, the wired communication protocol may include, for example, wired LAN, wired wide area network (wired WAN), power line communication (PLC), USB communication, Ethernet, serial communication, optical/coaxial cable, and the like.

In the hardware system 2000 according to the first embodiment, each component of the controller 15 stored in the form of a software module in the memory 2210 performs an interface with the communication unit 2310 through the memory interface 2200 and the peripheral device interface 2300 in the form of an instruction executed by the processor 2100.

Figure 4:
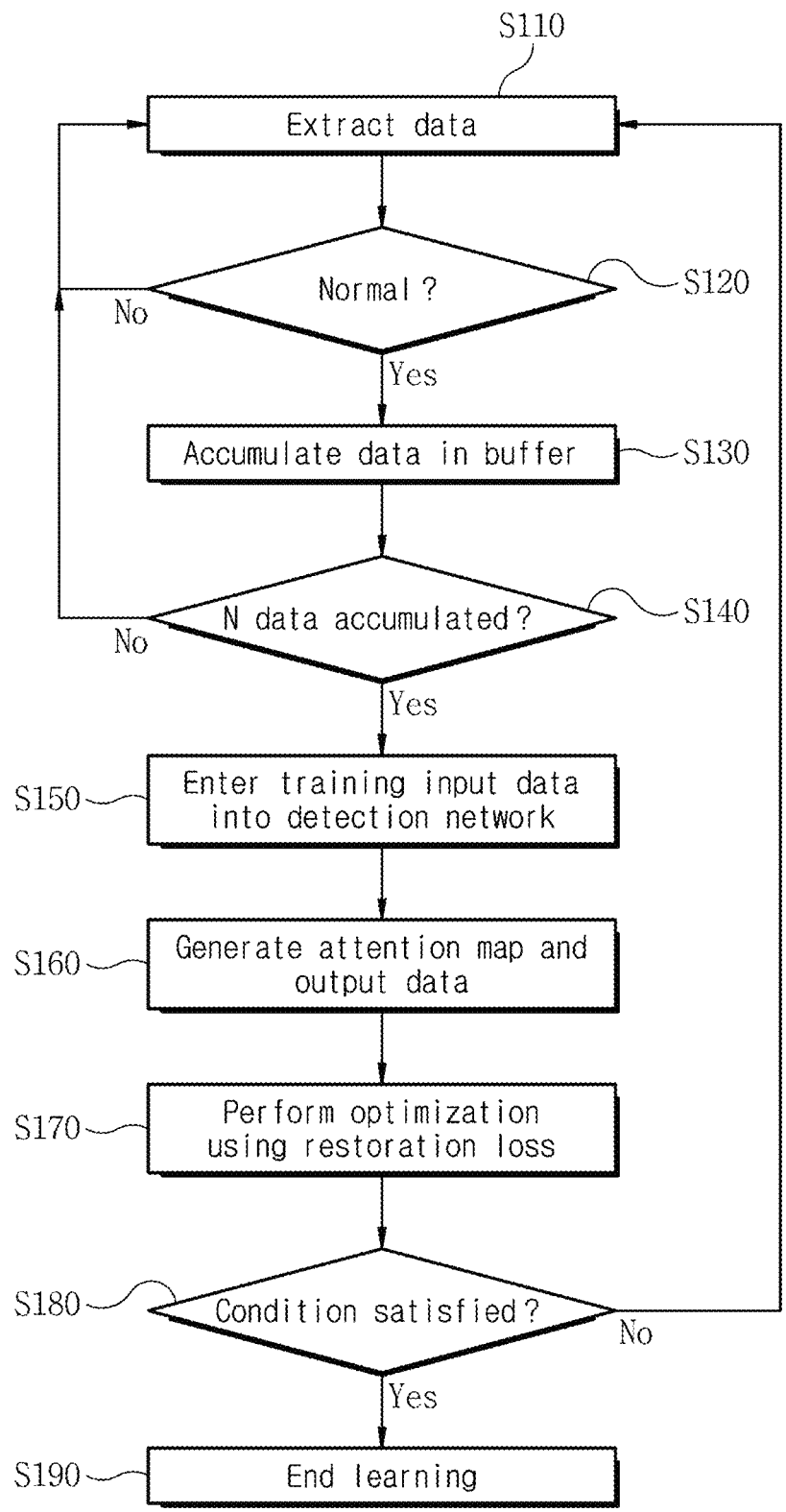
FIG. 4 is a flowchart illustrating a method for training a detection network for anomaly detection using an attention mechanism according to the first embodiment of the present disclosure.

Next, a method for anomaly detection using the attention mechanism according to the first embodiment of the present disclosure will be described. According to the first embodiment, the detection network DN should be trained for anomaly detection. First, a learning method in case where the detection network DN is a generative network that generates output data that imitates input data will be described. FIG. 4 is a flowchart illustrating a method for training a detection network for anomaly detection using an attention mechanism according to the first embodiment of the present disclosure.

In the first embodiment of FIG. 4, it is assumed that the data collector 11 collects images of a product produced in a production facility such as a smart factory and stores them in the storage 14.

Referring to FIG. 4, at step S110, the learning unit 100 sequentially extracts data (e.g., images of a product) stored in the storage 200. At step S120, the learning unit 100 determines whether each of the extracted data is in a normal state or an abnormal state. Then, at step S130, the learning unit 100 selects only data in a normal state and accumulates them in a buffer as training input data. In the first embodiment, the abnormal state refers to a case where the product contained in the image is an abnormal product, and the normal state refers to a case where the product contained in the image is a normal product.

Next, at step S140, the learning unit 100 determines whether a predetermined number (N) of training input data are accumulated.

If it is determined at the step S140 that less than a predetermined number (N) of training input data are accumulated, the learning unit 100 repeats the steps S110 to S130. On the other hand, if it is determined at the step S140 that a predetermined number (N) of training input data are accumulated, the learning unit 100 enters at step S150 the accumulated training input data into the detection network DN which is in an initial state or in a state that learning is not completed.

Then, at step S160, the detection network DN generates an attention map by performing a plurality of operations in which a plurality of layer weights are applied to the training input data, and derives training output data that imitates the training input data.

Then, at step S170, the learning unit 100 calculates a restoration loss indicating a difference between the training input data and the training output data imitating the training input data, and performs optimization for updating the weight of the detection network DN through a backpropagation algorithm to minimize the restoration loss.

Then, at step S180, the learning unit 100 determines whether a condition necessary for the end of learning is satisfied. This condition may be whether the restoration loss calculated at the step S170 is less than a predetermined target value. If it is determined at the step S180 that the condition necessary for the end of learning is not satisfied, that is, if the restoration loss calculated at the step S170 is greater than or equal to the target value, the process proceeds to the step S110 and repeats the steps S110 to S180. This means that learning is repeated using a plurality of different training input data. On the other hand, if it is determined at the step S180 that the condition necessary for the end of learning is satisfied, that is, if the restoration loss calculated at the step S170 is less than the target value, the process proceeds to step S190 to end the learning.

Figure 5:
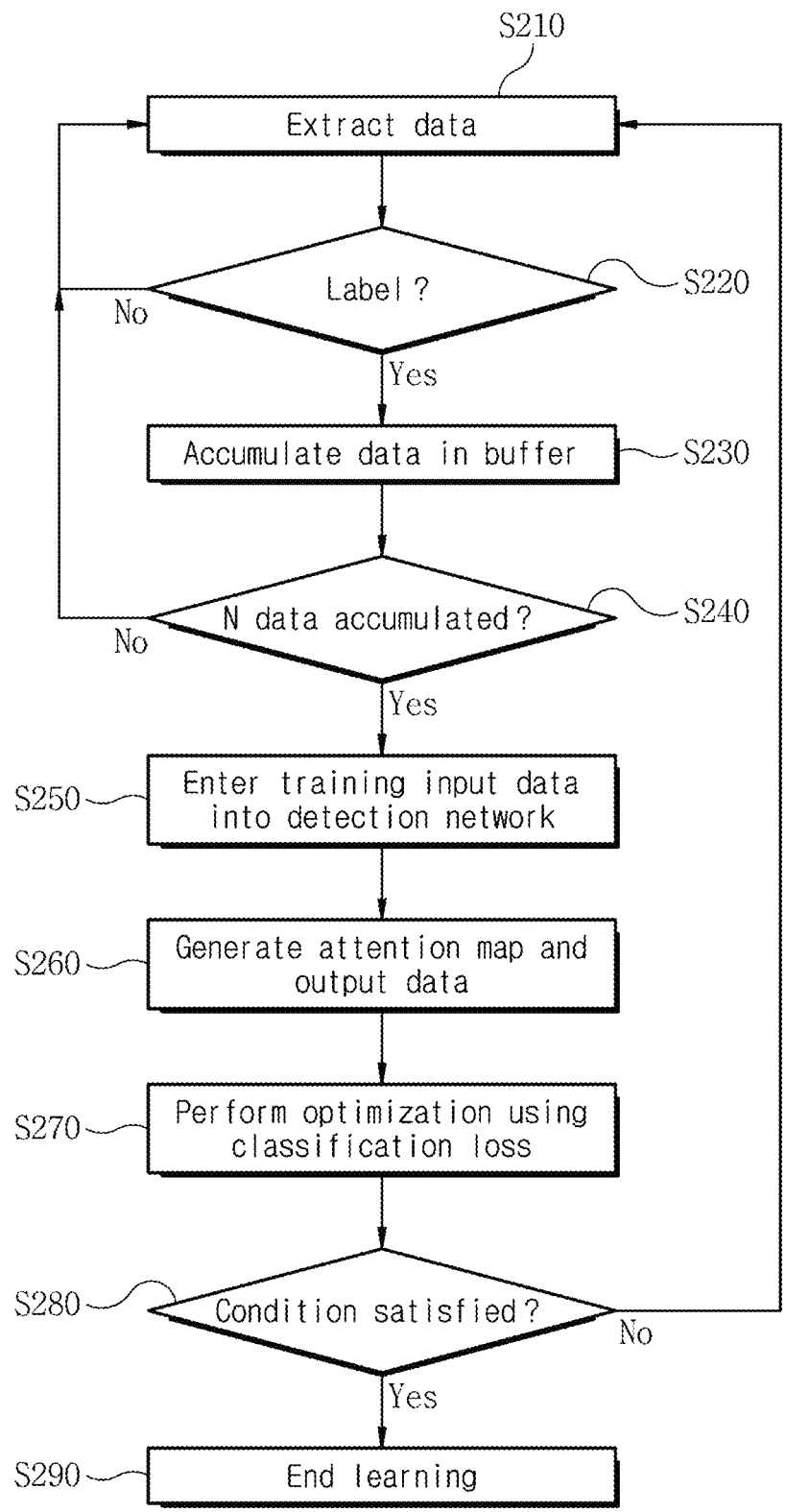
FIG. 5 is a flowchart illustrating a method for training a detection network for anomaly detection using an attention mechanism according to a modification of the first embodiment of the present disclosure.

Next, a learning method in case where the detection network DN is a classification network that generates output data for classifying input data will be described. FIG. 5 is a flowchart illustrating a method for training a detection network for anomaly detection using an attention mechanism according to a modification of the first embodiment of the present disclosure.

As in the first embodiment of FIG. 4, in the modification shown in FIG. 5, it is also assumed that the data collector 11 collects images of a product produced in a production facility such as a smart factory and stores them in the storage 14.

Referring to FIG. 5, at step S210, the learning unit 100 sequentially extracts data (e.g., images of a product) stored in the storage 200. At step S220, the learning unit 100 determines whether a label is assigned to each of the extracted data. At step S230, the learning unit 100 selects only the labeled data and accumulates them in a buffer as training input data. The label indicates whether each of the training input data is in a normal state or an abnormal state.

Next, at step S240, the learning unit 100 determines whether a predetermined number (N) of training input data are accumulated.

If it is determined at the step S240 that less than a predetermined number (N) of training input data are accumulated, the learning unit 100 repeats the steps S210 to S130. On the other hand, if it is determined at the step S240 that a predetermined number (N) of training input data are accumulated, the learning unit 100 enters at step S250 the accumulated training input data into the detection network DN which is in an initial state or in a state that learning is not completed.

Then, at step S260, the detection network DN generates an attention map by performing a plurality of operations in which a plurality of layer weights are applied to the training input data, and derives training output data that classify training input data according to a predefined classification criterion (e.g., a normal state and an abnormal state). The training output data refers to a probability value and includes a probability that the training input data is in a normal state and a probability that the training input data is in an abnormal state.

Then, at step S270, the learning unit 100 calculates a classification loss indicating a difference between the label corresponding to the training input data and the training output data corresponding to the training input data, and performs optimization for updating the weight of the detection network DN through a backpropagation algorithm to minimize the restoration loss.

Then, at step S280, the learning unit 100 determines whether a condition necessary for the end of learning is satisfied. This condition may be whether the classification loss calculated at the step S270 is less than a predetermined target value. If it is determined at the step S280 that the condition necessary for the end of learning is not satisfied, that is, if the classification loss calculated at the step S270 is greater than or equal to the target value, the process proceeds to the step S210 and repeats the steps S210 to S280. This means that learning is repeated using a plurality of different training input data. On the other hand, if it is determined at the step S280 that the condition necessary for the end of learning is satisfied, that is, if the classification loss calculated at the step S270 is less than the target value, the process proceeds to step S290 to end the learning.

Figure 6:
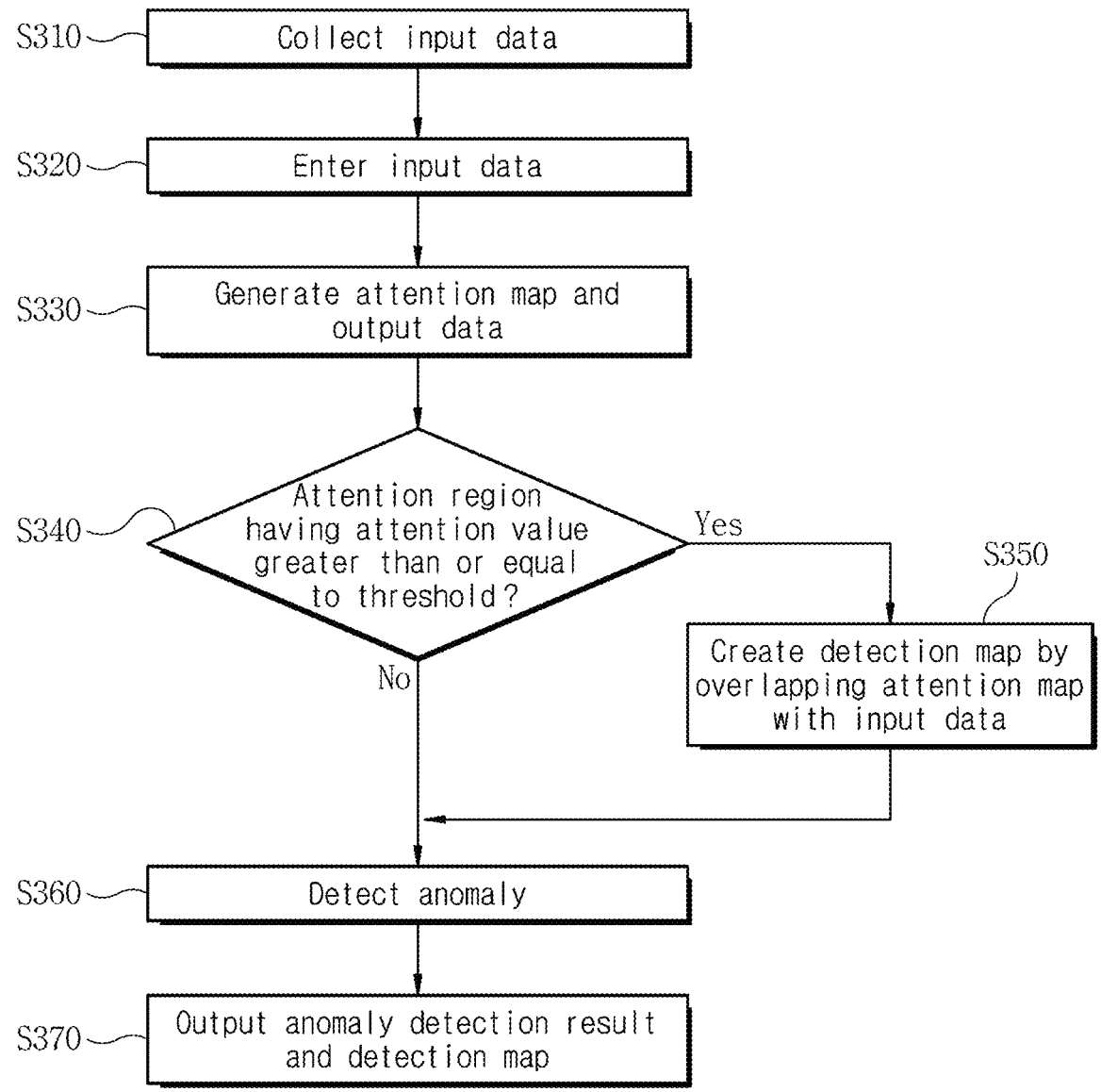
FIG. 6 is a flowchart illustrating a method for anomaly detection using an attention mechanism according to the first embodiment of the present disclosure.
Figure 7:
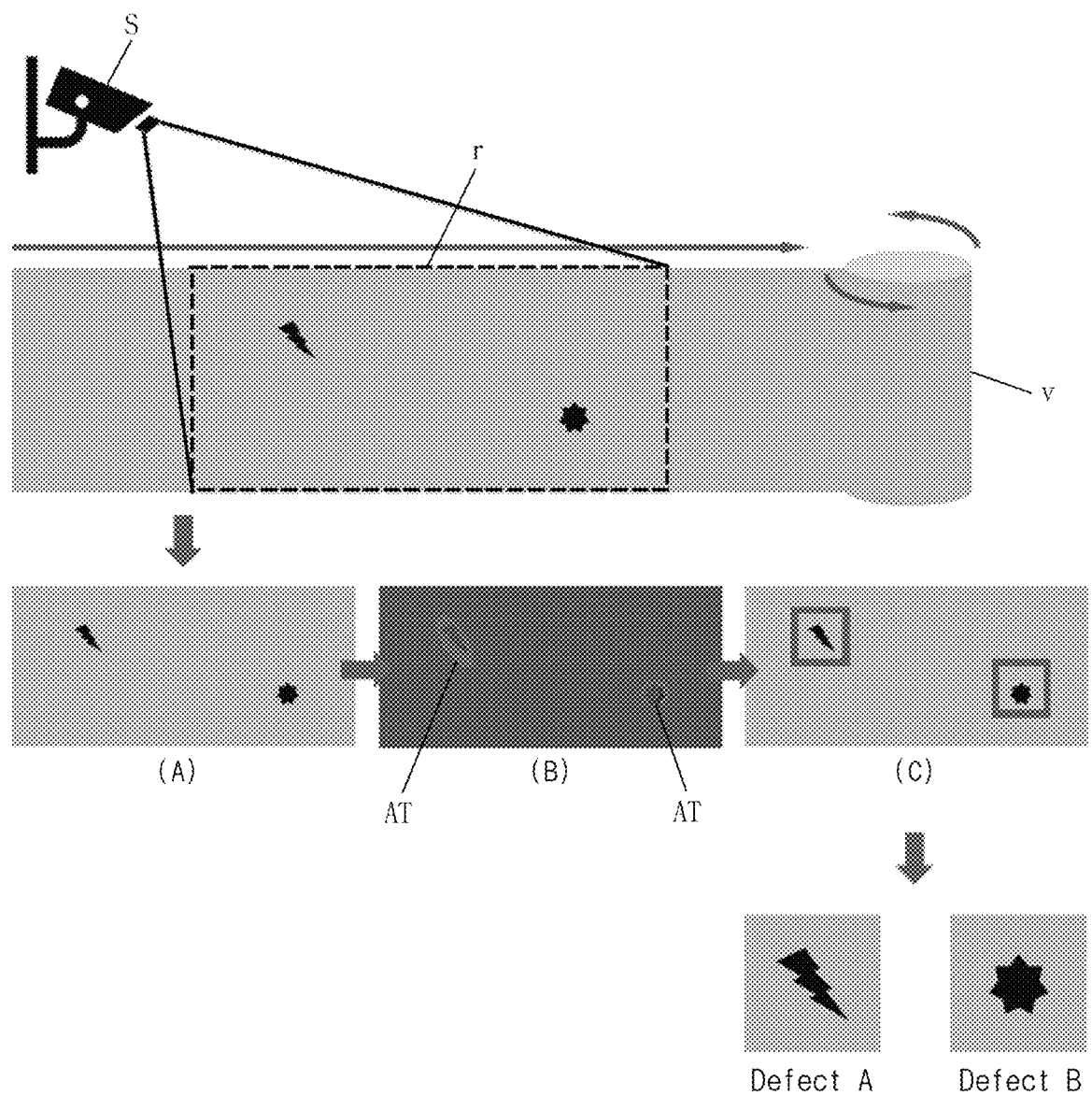
FIG. 7 is a diagram illustrating a method for extracting input data and overlapping an attention map and input data according to the first embodiment of the present disclosure.
Figure 8:
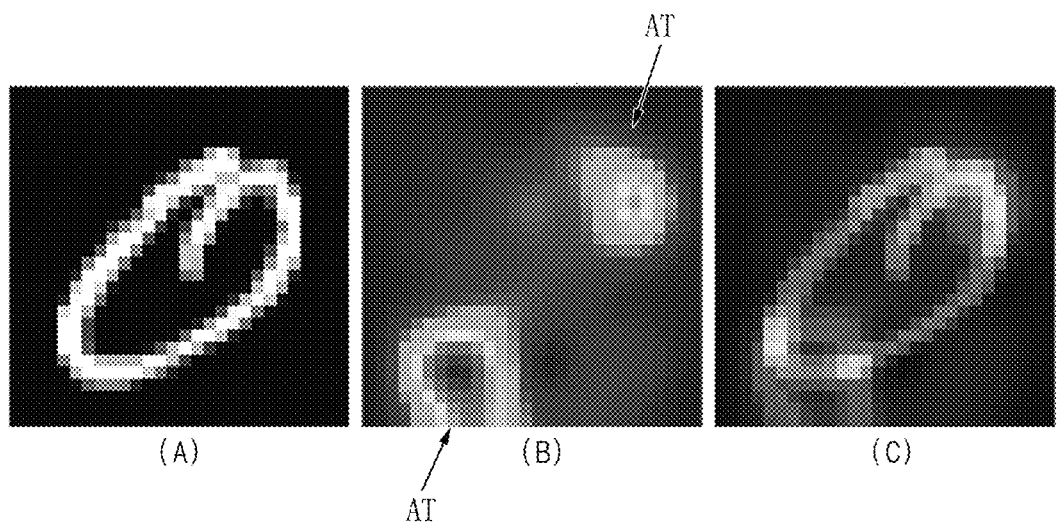
FIG. 8 is a diagram illustrating a method for overlapping an attention map for anomaly detection and input data according to the first embodiment of the present disclosure.

As described above, when learning of the detection network DN is completed, the detection network DN is provided to the detection unit 200. Then, using the detection network DN, the detection unit 200 can determine whether data is abnormal. This method will be described hereinafter. FIG. 6 is a flowchart illustrating a method for anomaly detection using an attention mechanism according to the first embodiment of the present disclosure. FIG. 7 is a diagram illustrating a method for extracting input data and overlapping an attention map and input data according to the first embodiment of the present disclosure. FIG. 8 is a diagram illustrating a method for overlapping an attention map for anomaly detection and input data according to the first embodiment of the present disclosure.

Referring to FIG. 6, at step S310, the data collector 11 (in FIG. 1) collects images of a product produced in a production facility and inputs them to the detection unit 200 (in FIG. 2). In other words, at the step S310, the detection unit 200 receives images of a product produced in a production facility through the data collector 11. For example, as shown in FIG. 7, an image obtained by photographing a region (r) of a product being moved by a conveyer belt (v) may be inputted.

Then, at step S320, the detection unit 200 enters the received images as input data to the detection network DN. Such input data may be, for example, an image as shown in part (A) of FIG. 7 or 8.

At step S330, the detection network DN generates an attention map and output data through a plurality of operations in which a plurality of layer weights are applied to input data. In FIGS. 7 and 8, part (B) shows an attention map. In part (B) of FIG. 7, only points where the calculated attention values are equal to or greater than a predetermined threshold are expressed in red, and in part (B) of FIG. 8, different colors are expressed in proportion to the calculated attention values. That is, in case of part (B) of FIG. 8, the higher the attention value, the closer to red color was expressed on the color wheel, and the lower the attention value, the closer to blue color was expressed on the color wheel.

When the attention map and the output data are generated, the detection unit 200 determines at step S340 whether an attention region having an attention value greater than or equal to a predetermined threshold exists in the attention map.

If it is determined at the step S340 that there is an attention region having an attention value greater than or equal to a predetermined threshold in the attention map, the process proceeds to step S350. On the other hand, if it is determined at the step S340 that there is no attention region having an attention value greater than or equal to a predetermined threshold in the attention map, the process proceeds to step S360.

At the step S350, the detection unit 200 creates a detection map by overlapping the attention map with the input data. The input data, the attention map, and the detection map have the same scale. For example, each part (B) of FIGS. 7 and 8 shows the attention map having an attention region AT having an attention value equal to or greater than a predetermined threshold. By overlapping the attention map shown in each part (B) of FIGS. 7 and 8 with the input data shown in each part (A) of FIGS. 7 and 8, the detection map is created as shown in each part (C) of FIGS. 7 and 8. As shown, the created detection map depicts an attention region AT having an attention value greater than or equal to a predetermined threshold in the input data. That is, the detection unit 200 can detect the attention region AT of the attention map and overlap it at the corresponding position in the input data.

At the step S360, based on the output data of the detection network DN, the detection unit 200 detects whether the input data is normal or abnormal.

According to one embodiment of the step S360, in case that the detection network DN is a generative network that generates output data imitating input data, the detection unit 200 determines the anomaly or not of the input data, based on a restoration loss indicating a difference between the input data and the output data. Specifically, the detection unit 200 calculates the restoration loss that indicates the difference between the input data and the output data. Then, the detection unit 200 determines whether the restoration loss is greater than or equal to a predetermined threshold. If the restoration loss is greater than or equal to a predetermined threshold, the detection unit 200 determines that the input data is abnormal. That is, it is determined that there is an abnormality in the product contained in the image of the input data. However, if the restoration loss is less than a predetermined threshold, the detection unit 200 determines that the input data is normal. That is, it is determined that the product contained in the image of the input data is normal.

According to another embodiment of the step S360, in case that the detection network DN is a classification network that generates output data for classifying input data, the detection unit 200 determines the anomaly or not of the input data, based on probabilities of a normal state and an abnormal state of the output data. That is, if the probability of the abnormal state of the output data is higher than the probability of the normal state and is greater than or equal to a predetermined threshold, the detection unit 200 determines that the input data is abnormal. That is, it is determined that there is an abnormality in the product contained in the image of the input data. However, if the probability of the abnormal state of the output data is less than a predetermined threshold, or if the probability of the normal state of the output data is higher than the probability of the abnormal state of the output data, the detection unit 200 determines that the input data is normal. That is, it is determined that the product contained in the image of the input data is normal.

Next, at step S370, the detection unit 200 outputs an anomaly detection result indicating whether the input data is abnormal, together with the detection map.

As such, when an abnormality occurs, the detection map is outputted together. Because the detection map indicates an attention region AT having an attention value equal to or greater than a threshold value in the input data as shown in part (C) of FIG. 7 or 8, it is possible to know not only whether an abnormality has occurred but also a region causing the abnormality.

Moreover, according to the present disclosure, it is possible to perform object recognition by using an anomaly detection and anomaly type classification model as it is without building a separate algorithm. In addition, it is possible to reduce the cost, including the effort required to build an object recognition algorithm. Further, it is possible to reduce the amount of computation because the anomaly detection and anomaly type classification model can be integrated into object recognition. As such, reducing the amount of computation makes it possible to increase the efficiency of constructing equipment used for system operation. In addition, as described above, it is possible to provide a basis for determination together with the results of anomaly detection and anomaly type classification. If a user, for example, a process manager, etc., receives only anomaly detection and abnormality type classification results, it is inconvenient to directly find the basis for determination. However, according to the present disclosure, it is possible to provide the basis for determination together and thereby minimize the hassle of manually finding the basis for determination.

Figure 9:
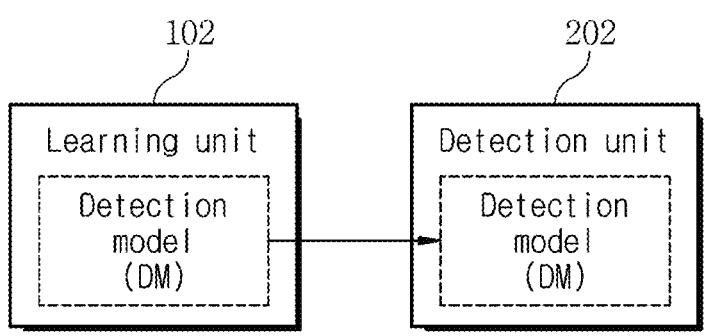
FIG. 9 is a diagram illustrating the configuration of an apparatus for anomaly detection based on an artificial neural network for minimizing computational cost according to a second embodiment of the present disclosure.
Figure 10:
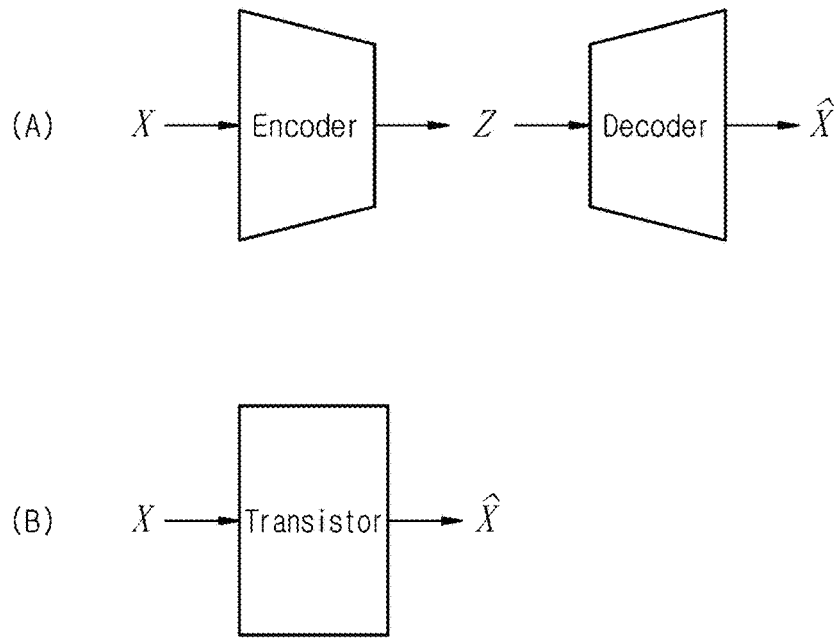
FIG. 10 is a diagram comparing an artificial neural network having a typical bottleneck structure and an artificial neural network having no bottleneck structure according to the second embodiment of the present disclosure.
Figure 11:
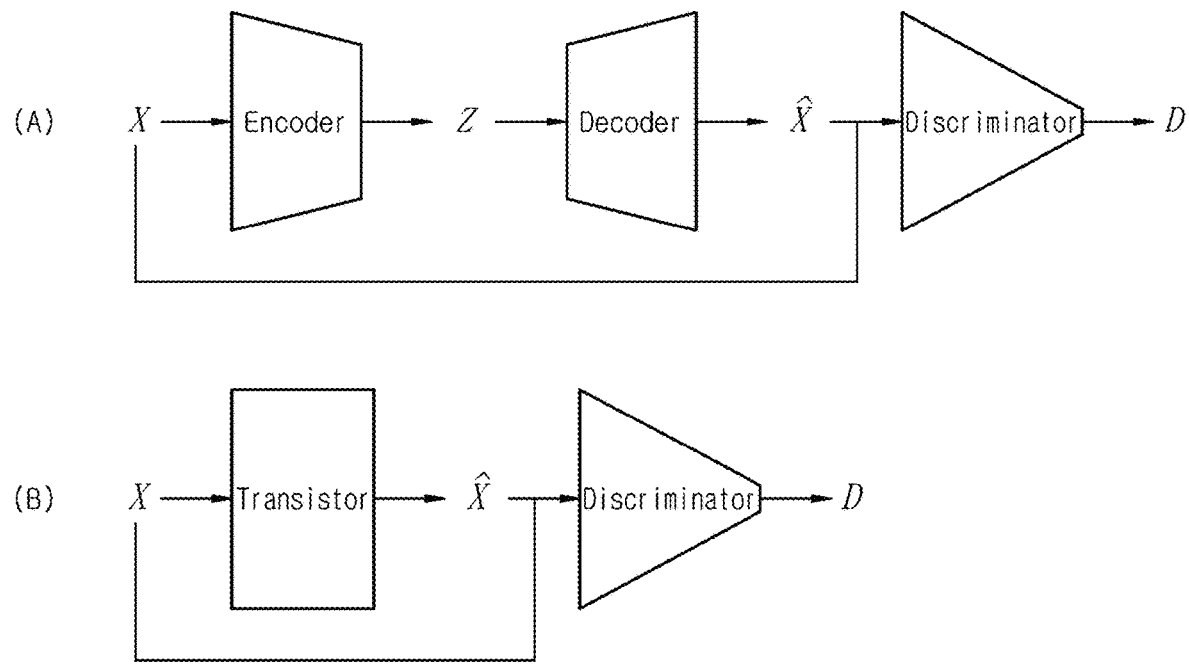
FIG. 11 is a diagram comparing an artificial neural network having a typical bottleneck structure and an artificial neural network having no bottleneck structure according to a modification of the second embodiment of the present disclosure.

Next, an apparatus for anomaly detection based on an artificial neural network for minimizing computational cost according to a second embodiment of the present disclosure will be described. FIG. 9 is a diagram illustrating the configuration of an apparatus for anomaly detection based on an artificial neural network for minimizing computational cost according to a second embodiment of the present disclosure. FIG. 10 is a diagram comparing an artificial neural network having a typical bottleneck structure and an artificial neural network having no bottleneck structure according to the second embodiment of the present disclosure. FIG. 11 is a diagram comparing an artificial neural network having a typical bottleneck structure and an artificial neural network having no bottleneck structure according to a modification of the second embodiment of the present disclosure.

Referring to FIG. 9, the anomaly detection apparatus 20 according to the second embodiment of the present disclosure includes a learning unit 102 and a detection unit 202.

The learning unit 102 is configured to generate a detection model DM. Using training data, the learning unit 102 can generate the detection model DM. The learning unit 102 can provide the generated detection model DM to the detection unit 202.

The detection unit 202 is configured to analyze input data through the detection model DM and thereby detect whether there is an abnormality in the input data. The input data may include time-series data such as a video signal and an audio signal, a photo and an image expressed in gray-scale or RGB, image data captured by a depth camera, an infrared camera, a thermal imaging camera, etc., and signals measured by sensors. For example, in case of an electrocardiogram signal measured by a sensor, the object of data may be a pulse. In case of an audio signal, the object of data may be a generated sound such as a speech utterance.

The detection model DM includes a plurality of layers, and each of the plurality of layers performs a plurality of operations. In one layer, each of operation results of a plurality of operation modules is weighted and then transmitted to the next layer. This means that a weight is applied to an operation result of one layer and the weighted result is inputted to the operation of the next layer. That is, the detection model DM performs a plurality of operations in which weights of a plurality of layers are applied. Such a detection model DM may be, for example, a Restricted Boltzmann Machine (RBM), an Auto-Encoder (AE), or a Generative Adversarial Network (GAN). The plurality of layers of the detection model DM may include one or a combination of a fully-connected layer, a convolutional layer, a recurrent layer, and a graph layer.

The detection model DM according to the second embodiment does not have a bottleneck structure. In case of an Auto-Encoder (AE) as shown in part (A) of FIG. 10, the bottleneck structure includes an encoder that compresses input data (X) and generates a latent vector (Z), and a decoder that expands the latent vector (Z) and generates restored data ($\hat{X}$). In contrast, in case that the detection model DM according to the second embodiment is the AE, it includes, as shown in part (b) of FIG. 10, a transistor that performs an operation without a bottleneck structure of compressing input data (X) and expanding the compressed data. Such a transistor consists of one or more artificial neural network layers that do not change the dimension of data. That is, the transistor generates the restored data ($\hat{X}$) for the input data (X) without reducing or expanding the dimension.

Similarly, in case of typical Generative Adversarial Network (GAN) as shown in part (A) of FIG. 11, it includes, together with a discriminator, a bottleneck structure composed of an encoder and a decoder. In contrast, in case that the detection model DM of the present disclosure is the GAN, it includes a transistor and a discriminator without a bottleneck structure.

Because the detection model DM has a transistor structure as shown in part (B) of FIG. 10 or 11, each of a plurality of layers of the detection model DM performs primary transformation by applying a weight (or weight filter) of each layer to input data, performs secondary transformation by applying a nonlinear activation function to the primarily transformed data, and then propagates the secondarily transformed data to the next layer. In this case, each of the plurality of layers generates output data by performing operations (primary and secondary transformations) while maintaining the dimension of input data. Therefore, the restored data ($\hat{X}$) finally outputted from the transistor has the same dimension as the input data (X) although there is a difference in value (information) therebetween.

The detection unit 202 generates, using the detection model DM as described above, restored data by performing a plurality of operations in which a plurality of layer weights are applied to input data. In addition, the detection unit 202 calculates a verification error indicating a difference between the input data and the restored data. If the calculated verification error is equal to or greater than a threshold calculated in advance by the learning unit 102, the detection unit 202 determines that there is an abnormality in the input data.

On the other hand, although the detection model DM according to the second embodiment of the present disclosure has been described as a configuration including the transistor without the bottleneck structure composed of the encoder and the decoder, this configuration does not limit the detection network DN including the attention mechanism according to the first embodiment of the present disclosure as described above. That is, in constructing the generative model or the discriminative model for training the attention mechanism, both the encoder/decoder type and the transistor type are possible, and a combination thereof is also possible.

Figure 12:
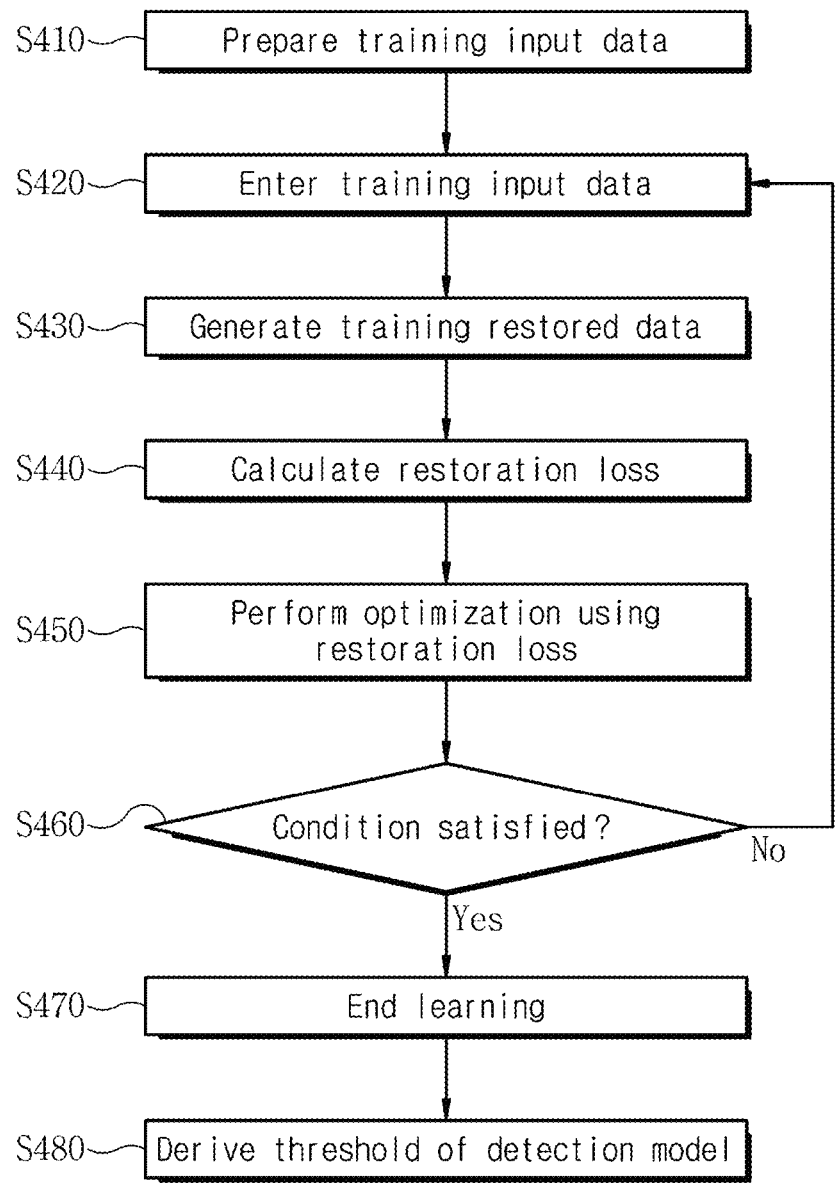
FIG. 12 is a flowchart illustrating a method for training a detection model according to the second embodiment of the present disclosure.

Next, a method for training the detection model DM according to the second embodiment of the present disclosure, that is, the detection model DM of the transistor structure as shown in part (B) of FIG. 10, will be described. FIG. 12 is a flowchart illustrating a method for training a detection model according to the second embodiment of the present disclosure.

Referring to FIG. 12, at step S410, the learning unit 102 prepares training input data. The training input data refers to input data in a normal state.

At step S420, the learning unit 102 enters the training input data into the detection model DM for which learning is not completed. This detection model DM has a transistor structure as described above in part (B) of FIG. 10.

Then, at step S430, the detection model DM generates training restored data imitating the training input data through a plurality of operations in which a plurality of layer weights are applied to the training input data. Because the detection model DM has a transistor structure as shown in part (B) of FIG. 10, each of a plurality of layers generates output data by performing operations while maintaining the dimension of input data. Therefore, the training restored data finally outputted has the same dimension as the training input data although there is a difference in value (information) therebetween.

Then, at step S440, the learning unit 102 calculates, through a loss function, a restoration loss indicating a difference between the training input data and the restored data generated by imitating the training input data.

Then, at step S450, the learning unit 102 performs optimization for updating the weight of the detection model DM through an optimization algorithm to minimize the restoration loss.

Then, at step S460, the learning unit 102 determines whether a condition necessary for the end of learning is satisfied. This condition may be whether the restoration loss calculated at the step S440 is less than a predetermined target value.

If it is determined at the step S460 that the condition necessary for the end of learning is not satisfied, that is, if the restoration loss calculated at the step S440 is greater than or equal to the target value, the process proceeds to the step S420 and repeats the steps S420 to S460. This means that learning is repeated using a plurality of different training input data.

On the other hand, if it is determined at the step S460 that the condition necessary for the end of learning is satisfied, that is, if the restoration loss calculated at the step S440 is less than the target value, the process proceeds to step S470 to end the learning.

When the learning is completed, at step S480, the learning unit 102 derives the threshold of the detection model DM. According to an embodiment, the learning unit 102 prepares a plurality of test input data. The test input data is prepared in the same method as the training input data. That is, like the training input data, the test input data means input data in a normal state. Next, the learning unit 102 enters a plurality of test input data into the detection model DM for the learning has been completed. Then, the detection model DM generates a plurality of test restored data imitating the plurality of test input data. Thus, the learning unit 102 calculates the threshold of the detection model DM through Equation 1 below.

$$\theta = \mu + (k \times \sigma) \qquad \text{[Equation 1]}$$

In Equation 1, $\theta$ denotes a threshold value. In addition, $\mu$ denotes the average of the mean squared error (MSE) between the plurality of test input data and the plurality of test restored data corresponding to the plurality of test input data. Also, $\sigma$ denotes the standard deviation of the mean squared error (MSE) between the plurality of test input data and the plurality of test restored data corresponding to the plurality of test input data. Also, k denotes a weight for the standard deviation, and it is a preset value. The learning unit 102 provides the detection unit 202 with the learning-completed detection model DM and the threshold value of the detection model DM.

Figure 13:
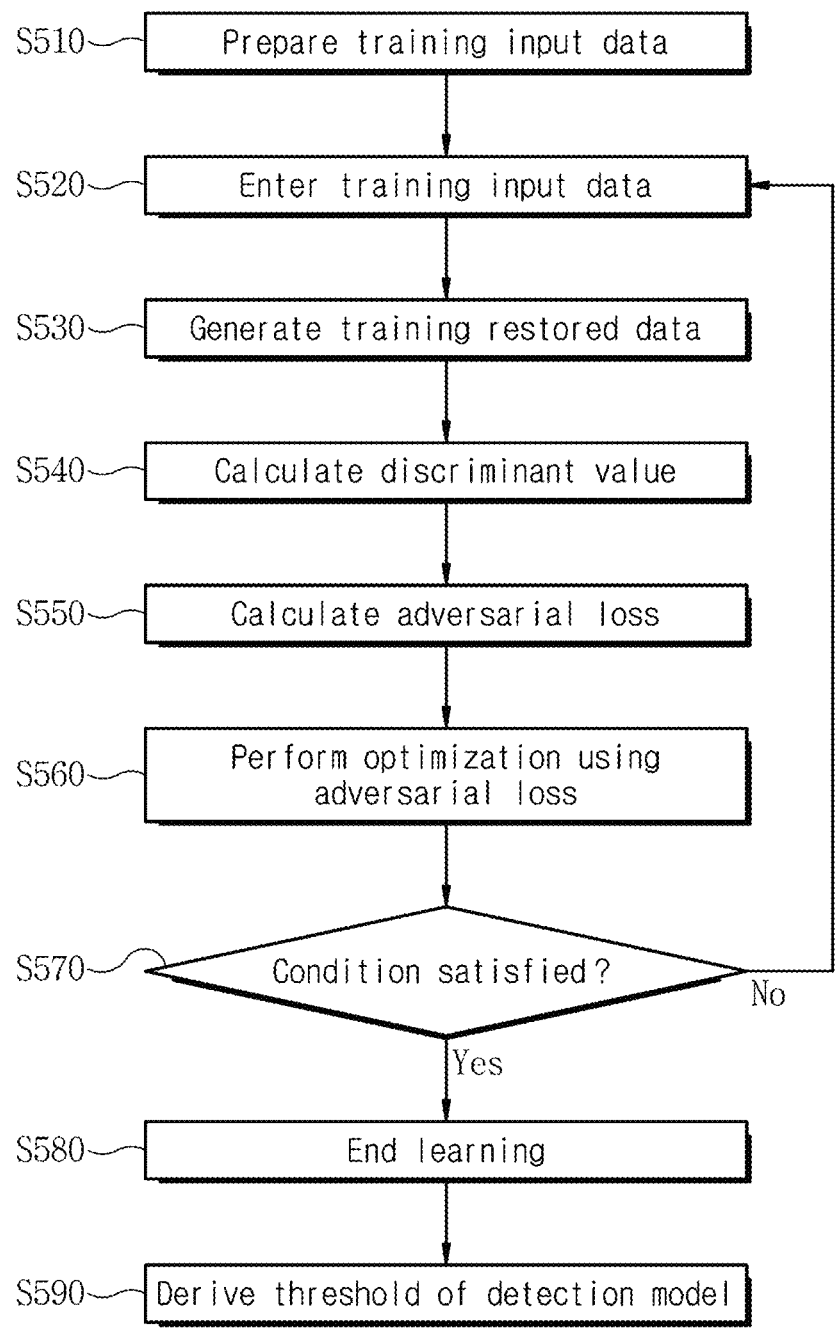
FIG. 13 is a flowchart illustrating a method for training a detection model according to a modification of the second embodiment of the present disclosure.

Next, a method for training the detection model DM according to a modification of the second embodiment of the present disclosure, that is, the detection model DM of a structure including a transistor and a discriminator as shown in part (B) of FIG. 11, will be described. FIG. 13 is a flowchart illustrating a method for training a detection model according to a modification of the second embodiment of the present disclosure.

Referring to FIG. 13, at step S510, the learning unit 102 prepares training input data. The training input data refers to input data in a normal state.

At step S520, the learning unit 102 enters the training input data (X) into the detection model DM for which learning is not completed. This detection model DM has a structure including a transistor and a discriminator as described above in part (B) of FIG. 11.

Then, at step S530, the transistor of the detection model DM generates training restored data ($\hat{X}$) imitating the training input data through a plurality of operations in which a plurality of layer weights are applied to the training input data (X). Because the detection model DM has a transistor structure as shown in part (B) of FIG. 10, each of a plurality of layers generates output data by performing operations while maintaining the dimension of input data. Therefore, the training restored data ($\hat{X}$) finally outputted has the same dimension as the training input data (X) although there is a difference in value (information) therebetween.

Then, at step S540, the discriminator of the detection model DM calculates a discriminant value by performing an operation on each of the training input data (X) and the training restored data ($\hat{X}$). The discriminant value includes, as to the training input data (X), a probability that it is real data not processed by the transistor, and a probability that it is fake data processed by the transistor. In addition, the discriminant value includes, as to the training restored data ($\hat{X}$), a probability that it is real data not processed by the transistor, and a probability that it is fake data processed by the transistor.

Next, at step S550, the learning unit 102 calculates an adversarial loss that is a difference between the discriminant values which are the operation results of the discriminator for the training input data (X) and the training restored data ($\hat{X}$).

Then, at step S560, the learning unit 102 performs optimization for updating the weight of the detection model DM through an optimization algorithm to minimize the adversarial loss.

Then, at step S570, the learning unit 102 determines whether a condition necessary for the end of learning is satisfied. This condition may be whether the adversarial loss calculated at the step S550 is less than a predetermined target value.

If it is determined at the step S570 that the condition necessary for the end of learning is not satisfied, that is, if the adversarial loss calculated at the step S550 is greater than or equal to the target value, the process proceeds to the step S520 and repeats the steps S520 to S570. This means that learning is repeated using a plurality of different training input data.

On the other hand, if it is determined at the step S570 that the condition necessary for the end of learning is satisfied, that is, if the adversarial loss calculated at the step S550 is less than the target value, the process proceeds to step S580 to end the learning.

When the learning is completed, at step S590, the learning unit 102 derives the threshold of the detection model DM. According to an embodiment, the learning unit 102 prepares a plurality of test input data. The test input data is prepared in the same method as the training input data. That is, like the training input data, the test input data means input data in a normal state. Next, the learning unit 102 enters a plurality of test input data into the detection model DM for the learning has been completed. Then, the detection model DM generates a plurality of test restored data imitating the plurality of test input data. Thus, the learning unit 102 calculates the threshold of the detection model DM through the above-described Equation 1. The learning unit 102 provides the detection unit 202 with the learning-completed detection model DM and the threshold value of the detection model DM.

Figure 14:
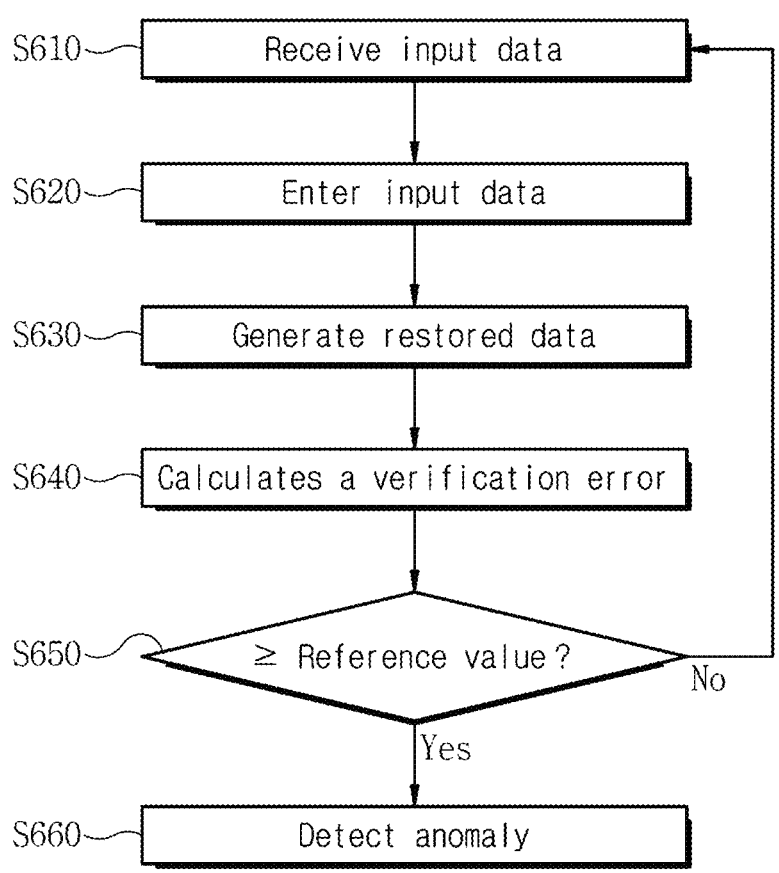
FIG. 14 is a flowchart illustrating a method for anomaly detection based on an artificial neural network for minimizing computational cost according to the second embodiment of the present disclosure.

Next, a method for anomaly detection based on an artificial neural network for minimizing computational cost according to the second embodiment of the present disclosure will be described. FIG. 14 is a flowchart illustrating a method for anomaly detection based on an artificial neural network for minimizing computational cost according to the second embodiment of the present disclosure.

Referring to FIG. 14, at step S610, the detection unit 202 receives input data. The input data is data collected for anomaly detection. The input data may include time-series data such as a video signal and an audio signal, a photo and an image expressed in gray-scale or RGB, image data captured by a depth camera, an infrared camera, a thermal imaging camera, etc., and signals measured by sensors. For example, in case of an electrocardiogram signal measured by a sensor, the object of data may be a pulse. In case of an audio signal, the object of data may be a generated sound such as a speech utterance.

At step S620, the detection unit 202 enters the input data into the detection model DM. Then, at step S630, the transistor of the detection model DM generates restored data ($\hat{X}$) imitating the input data through a plurality of operations in which a plurality of layer weights are applied to the input data (X). Because the detection model DM has a transistor structure as shown in part (B) of FIG. 10 or 11, each of a plurality of layers generates output data by performing operations while maintaining the dimension of input data. Therefore, the restored data ($\hat{X}$) finally outputted from the transistor has the same dimension as the input data (X) although there is a difference in value (information) therebetween.

Next, at step S640, the detection unit 202 calculates a verification error indicating a difference between the input data (X) and the restored data ($\hat{X}$).

Then, at step S650, the detection unit 202 determines whether the calculated verification error is equal to or greater than a predetermined reference value θ as shown in Equation 2 below.

$$\|X-\hat{X}\| \geq \theta \quad \text{[Equation 2]}$$

If it is determined at the step S650 that the verification error ($\|X-\hat{X}\|$) is equal to or greater than the reference value (θ), the detection unit 202 detects at step S660 that an abnormality has occurred in the corresponding input data.

Figure 15:
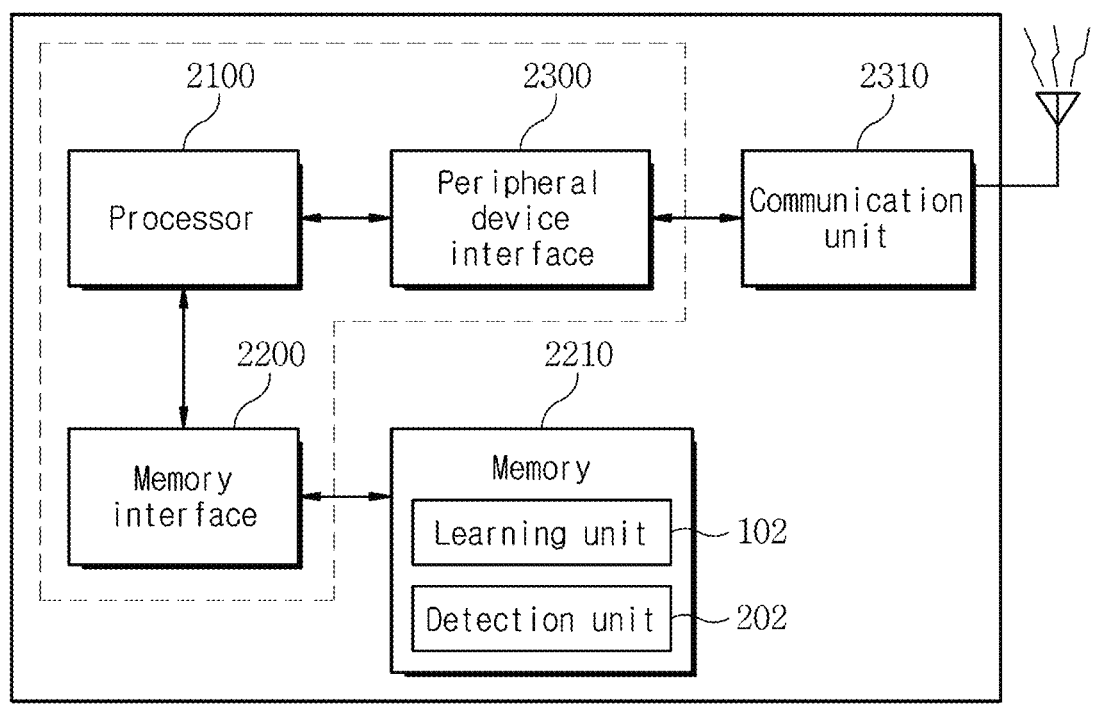
FIG. 15 is an exemplary diagram illustrating a hardware system for implementing an apparatus for anomaly detection based on an artificial neural network for minimizing computational cost according to the second embodiment of the present disclosure.

FIG. 15 is an exemplary diagram illustrating a hardware system for implementing an apparatus for anomaly detection based on an artificial neural network for minimizing computational cost according to the second embodiment of the present disclosure.

As shown in FIG. 15, the hardware system 2000 according to the second embodiment may have components including a processor 2100, a memory interface 2200, and a peripheral device interface 2300.

Each component in the hardware system 2000 may be an individual electronic component or be integrated in one or more integrated circuits, and these components may be electrically connected to each other via a bus system (not shown).

The bus system may include one or more individual physical buses, connected by suitable bridges, adapters, and/or controllers, communication lines/interfaces, and/or an abstraction representing multi-drop or point-to-point connections.

The processor 2100 communicates with the memory 2210 through the memory interface 2200 to perform various functions in the hardware system, thereby executing various software modules stored in the memory 2210.

In the memory 2210, the learning unit 102 and the detection unit 202, which are components described above with reference to FIG. 10, may be stored in the form of a software module. Also, an operating system (OS) or the like may be further stored. Each of the learning unit 102 and the detection unit 202 may be loaded and executed in the processor 2100.

Each of the learning unit 102 and the detection unit 202 may be implemented in the form of a software module, a hardware module, or a combination thereof executed by a processor.

Such a software module, hardware module, or its combination, executed by a processor, may be implemented as an actual hardware system such as a computer system.

The operating system may be, for example, an embedded operating system such as I-OS, Android, Darwin, RTXC, LINUX, UNIX, OS X, WINDOWS, or VxWorks. The operating system includes various procedures, instruction sets, software components, and/or drivers for controlling and managing general system tasks (e.g., memory management, storage device control, power management, etc.), and serves to facilitate communication between various hardware modules and software modules.

The memory 2210 may include, but is not limited to, a cache, a main memory, and a secondary memory. The memory 2210 may include a memory hierarchy implemented through any combination of a RAM (e.g., SRAM, DRAM, DDRAM), ROM, FLASH, magnetic and/or optical storage device (e.g., disk drive, magnetic tape, compact disk (CD), and digital video disc (DVD), etc.).

The peripheral device interface 2300 serves to enable communication between the processor 2100 and peripheral devices.

The peripheral devices are for providing different specific functions to the hardware system 2000. In the first embodiment, the peripheral devices may include, for example, a communication unit 2310.

The communication unit 2310 performs a communication function with other devices. To this end, the communication unit 2310 may include, but is not limited to, an antenna system, an RF transceiver, one or more amplifiers, a tuner, one or more oscillators, a digital signal processor, a CODEC chipset, a memory, and a suitable circuit.

The communication unit 2310 may support wired/wireless communication protocols. The wireless communication protocol may include, for example, wireless local area network (WLAN), digital living network alliance (DLNA), wireless broadband (Wibro), world interoperability for microwave access (Wimax), global system for mobile communication (GSM), code division multi access (CDMA), CDMA2000, enhanced voice-data optimized or enhanced voice-data only (EV-DO), wideband CDMA (WCDMA), high speed downlink packet access (HSDPA), high speed uplink packet access (HSUPA), IEEE 802.16, long term evolution (LTE), LTE-Advanced (LTE-A), 5G communication system, wireless mobile broadband service (WMBS), Bluetooth, radio frequency identification (RFID), infrared data association (IrDA), ultra-wideband (UWB), ZigBee, near field communication (NFC), ultra sound communication (USC), visible light communication (VLC), Wi-Fi, Wi-Fi direct, and the like. In addition, the wired communication protocol may include, for example, wired LAN, wired wide area network (wired WAN), power line communication (PLC), USB communication, Ethernet, serial communication, optical/coaxial cable, and the like.

In the hardware system 2000 according to the second embodiment, each component stored in the form of a software module in the memory 2210 performs an interface with the communication unit 2310 through the memory interface 2200 and the peripheral device interface 2300 in the form of an instruction executed by the processor 2100.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Also, although the present specifications describe that operations are performed in a predetermined order with reference to a drawing, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

Certain embodiments of the subject matter described herein have been described. Other embodiments are within the scope of the following claims. For example, the operations recited in the claims may be performed in a different order and still achieve desirable results. By way of example, the process illustrated in the accompanying drawings does not necessarily require a particular illustrated sequence or sequential order to obtain desired results. In certain implementations, multitasking and parallel processing may be advantageous.

While this disclosure has been particularly shown and described with reference to an exemplary embodiment thereof, it will be understood by those skilled in the art that various changes in form and details may be made therein without departing from the scope of this disclosure as defined by the appended claims.

What is claimed is:

1. A method for anomaly detection comprising:
    preparing, by a learning unit, training input data by selecting data in a normal state;
    entering, by the learning unit, the training input data into a detection network;
    generating, by the detection network, an attention map by performing a plurality of operations in which a plurality of layer weights are applied to the training input data, followed by deriving training output data imitating the training input data;
    calculating, by the learning unit, a restoration loss indicating a difference between the training input data and the training output data;
    performing, by the learning unit, optimization for updating a weight of the detection network through a back-propagation algorithm to reduce the restoration loss;
    entering, by the detection unit, input data into a detection network;
    generating, by the detection network, an attention map and output data through a plurality of operations in which a plurality of layer weights are applied to the input data;
    generating, by the detection unit, an attention map by overlapping the attention map with the input data when an attention region having an attention value greater than or equal to a predetermined threshold exists in the attention map;
    detecting, by the detection unit, whether the input data is normal or abnormal according to the output data; and
    outputting, by the detection unit, the detection map and an anomaly detection result indicating whether the input data is normal or abnormal.

2. The method of claim 1, wherein the detection unit determines whether the input data is normal or abnormal based on a restoration loss indicating a difference between the input data and the output data.

3. The method of claim 1, wherein the detection network is a classification network and the detection unit determines whether the input data is normal or abnormal, based on a probability of a normal state of the output data and a probability of an abnormal state of the output data.

4. The method of claim 1, further comprising:
    wherein the detection network is a classification network, before entering, by the detection unit, the input data into the detection network,
    preparing, by a learning unit, training input data to which a label is assigned;

entering, by the learning unit, the training input data into the detection network;
generating, by the detection network, an attention map by performing a plurality of operations in which a plurality of layer weights are applied to the training input data, followed by calculating training output data including a probability of a normal state of the training input data and a probability of an abnormal state of the training input data;
calculating, by the learning unit, a classification loss indicating a difference between the label and the training output data; and
performing, by the learning unit, optimization for updating a weight of the detection network through a back-propagation algorithm to reduce the classification loss.

5. A method for anomaly detection comprising:
preparing, by a learning unit, training input data;
entering, by the learning unit, the training input data into a detection model for which learning is not completed;
generating, by the detection model, training restored data imitating the training input data while maintaining dimension of the training input data through an operation on the training input data;
calculating, by the learning unit, a restoration loss indicating a difference between the training input data and training output data; and
performing, by the learning unit, optimization for updating a weight of the detection model to reduce the restoration loss;
entering, by a detection unit, input data into a detection model;
generating, by the detection model, restored data imitating the input data by performing an operation on the input data while maintaining a dimension of the input data;
calculating, by the detection unit, a verification error indicating a difference between the input data and the restored data; and
detecting, by the detection unit, an anomaly of the input data when the verification error is equal to or greater than a predetermined reference value.

6. The method of claim 5, wherein each of a plurality of layers in the detection model generates output data by performing operations while maintaining the dimension of the input data, whereby the generated restored data has a same dimension as the input data and has a difference in value.

7. The method of claim 5, further comprising:
before entering, by the detection unit, the input data into the detection model,
preparing, by a learning unit, training input data;
entering, by the learning unit, the training input data into the detection model for which learning is not completed;
generating, by a transistor of the detection model, training restored data imitating the training input data while maintaining the dimension of the training input data through an operation on the training input data;
calculating, by a discriminator of the detection model, a discriminant value by performing an operation on the training input data and the training restored data, wherein the discriminant value indicates a probability that each of the training input data and the training restored data is real data or fake data;
calculating, by the learning unit, an adversarial loss indicating a difference of the discriminant value between the training input data and the training output data; and
performing, by the learning unit, optimization for updating a weight of the detection model to reduce the adversarial loss.

8. The method of claim 7, further comprising:
calculating, by the learning unit, a threshold value $\theta$ of the detection model through Equation $\theta=\mu+(k\times\sigma)$ wherein $\mu$ denotes an average of a mean squared error (MSE) between a plurality of test input data and a plurality of test restored data corresponding to the plurality of test input data, $\sigma$ denotes a standard deviation of the MSE between the plurality of test input data and the plurality of test restored data corresponding to the plurality of test input data, and k denotes a weight for the standard deviation.

9. The method of claim 5, further comprising:
calculating, by the learning unit, a threshold value $\theta$ of the detection model through Equation $\theta=\mu+(k\times\sigma)$ wherein $\mu$ denotes an average of a mean squared error (MSE) between a plurality of test input data and a plurality of test restored data corresponding to the plurality of test input data, $\sigma$ denotes a standard deviation of the MSE between the plurality of test input data and the plurality of test restored data corresponding to the plurality of test input data, and k denotes a weight for the standard deviation.

* * * * *